(12) United States Patent
Au et al.

(10) Patent No.: US 7,099,539 B1
(45) Date of Patent: Aug. 29, 2006

(54) OPTICAL ISOLATOR, ATTENUATOR AND POLARIZER SYSTEM AND METHOD FOR INTEGRATED OPTICS

(75) Inventors: Chi Au, Union City, CA (US); Tzu-Yih Chu, San Jose, CA (US); Hao Yin, San Jose, CA (US); Abraham C. Ma, Fremont, CA (US); Edward W. Lee, Mountain View, CA (US)

(73) Assignee: Super Talent Electronics, Inc., San Jose, CA (US)

( * ) Notice: Subject to any disclaimer, the term of this patent is extended or adjusted under 35 U.S.C. 154(b) by 224 days.

(21) Appl. No.: 10/615,318

(22) Filed: Jul. 7, 2003

(51) Int. Cl.
*G02B 6/26* (2006.01)

(52) U.S. Cl. .......................... 385/45; 385/39

(58) Field of Classification Search .................. 385/45, 385/46, 3
See application file for complete search history.

(56) References Cited

U.S. PATENT DOCUMENTS

| | | | |
|---|---|---|---|
| 5,362,985 A | 11/1994 | Ma et al. ..................... 257/707 |
| 5,428,695 A | 6/1995 | Ohta ............................ 385/14 |
| 5,436,992 A * | 7/1995 | Wang et al. .................. 385/45 |
| 5,441,150 A | 8/1995 | Ma ............................. 206/707 |
| 5,463,705 A | 10/1995 | Clauberg et al. ............. 385/14 |
| 5,465,310 A * | 11/1995 | Kersten et al. ............... 385/22 |
| 5,486,723 A | 1/1996 | Ma et al. ..................... 257/707 |
| 5,623,813 A | 4/1997 | Ma ............................. 53/467 |
| 5,651,176 A | 7/1997 | Ma et al. ..................... 29/740 |
| 5,841,686 A | 11/1998 | Chu et al. .................... 365/51 |
| 5,856,937 A | 1/1999 | Chu et al. .................... 365/51 |
| 5,941,447 A | 8/1999 | Chu et al. ............... 228/180.21 |
| 5,982,653 A | 11/1999 | Chu .............................. 365/63 |
| 5,996,880 A | 12/1999 | Chu et al. ............... 228/180.21 |
| 6,144,780 A * | 11/2000 | Marcuse et al. .............. 385/16 |
| 6,288,827 B1 | 9/2001 | Kawai et al. ................ 359/283 |
| 6,297,901 B1 | 10/2001 | Kim ............................ 359/281 |
| 6,324,312 B1 * | 11/2001 | Liao et al. ..................... 385/11 |
| 2002/0076149 A1* | 6/2002 | Deacon ........................ 385/27 |
| 2004/0202424 A1* | 10/2004 | Cournoyer et al. ........... 385/39 |

OTHER PUBLICATIONS

Born, M. & Wolf, E., "Principles of Optics 1999 Cambridge University Press".
Dutton, Harry J.R., "Understanding Optical Communications", Prentice Hall, Dec. 1, 1998.

* cited by examiner

*Primary Examiner*—Ellen E. Kim
(74) *Attorney, Agent, or Firm*—Bever, Hoffman & Harms, LLP; Patrick T. Bever (57) ABSTRACT

An optical system and associated method are provided. Included is a first branch capable of allowing light to pass therethrough in a forward direction and a reverse direction. The first branch includes a first medium with a first refractive index ($n_1$), and a first end and a second end. Also included is a second branch capable of allowing light to pass therethrough in the forward direction. The second branch includes a second medium with a second refractive index ($n_2$, with $n_2 < n_1$), and a first end and a second end. The second end of the second branch is further coupled to the first branch to form an angle ($\theta_2$). In use, $\theta_1 \leq \sin^{-1}(n_2/n_1)$ in order to prevent the light passing through the first branch in the reverse direction from passing into the second branch, where $\theta_1$ is the incident angle of the light passing in the reverse direction from the first branch to the second branch.

26 Claims, 11 Drawing Sheets

OPTICAL ISOLATOR, ATTENUATOR AND POLARIZER SYSTEM AND METHOD FOR INTEGRATED OPTICS

FIELD AND BACKGROUND OF THE INVENTION

The present invention relates to optics, and more particularly to optical isolators.

BACKGROUND OF THE INVENTION

An optical isolator is a 1×1 unidirectional connector. It allows light to travel along a path in one direction only but not in the reverse direction within an optical system.

Optical isolators are typically employed in bulk optical systems to eliminate one of two counter-propagating electromagnetic light waves. An optical isolator is comparable with a diode having a low electrical resistance for the forward current from its input to its output and a very high resistance for the reverse current from its output to its input. Analogous, a forward light wave, fed via the optical input port of an optical isolator to its output port, is guided with low loss, and a reverse light wave, i.e. a light wave being fed to the isolator's optical output port, is attenuated such that only a very small amount thereof leaves the isolator via its input port. Such an optical isolator has a unidirectional transmittance property, and cuts off most of the light fed back into its output port.

The "non-reciprocity principle" may be applied to such optical devices to achieve the required isolation. The non-reciprocity principle refers to the fact that an optical signal transmits only in the forward direction but not in reverse. An ideal optical isolator is based on this non-reciprocity principle.

A Faraday rotator is one prior art optical isolator, which employs a magnetic-optic element as a non-reciprocal component. Unfortunately, such prior art optical isolator exhibits many difficulties. Not only is its function polarization dependent, but it is also difficult to be integrated with other optical devices.

DISCLOSURE OF THE INVENTION

An optical system and associated method are provided. Included is a first branch capable of allowing light to pass therethrough in a forward direction and a reverse direction. The first branch includes a first medium with a first refractive index ($n_1$), and a first end and a second end. Also included is a second branch capable of allowing light to pass therethrough in the forward direction. The second branch includes a second medium with a second refractive index ($n_2$, with $n_2 < n_1$), and a first end and a second end. The second end of the second branch is further coupled to the first branch to form an angle ($\theta_2$). In use, $\theta_1 \geq \sin^{-1}(n_2/n_1)$ to utilize the total reflection principle to prevent the light passing through the first branch in the reverse direction from passing into the second branch, where $\theta_1$ is the incident angle of the light passing in the reverse direction from the first branch to the second branch.

In some embodiments, the first branch and the second branch may be components of a Y-junction, a K-junction, and/or an X-junction.

As an option, the first branch may include an optical absorber for absorbing the reverse light that is prevented from passing into the second branch by the total reflection. In another embodiment, an optical choker may be positioned at one of the ends of one of the branches for increasing isolation.

In use, the isolation provided between the first branch and the second branch is polarization independent. As an option, a numerical aperture of one of the ends of one of the branches may be lowered for increasing the isolation. Moreover, a transmitting area of one of the branches may be decreased for increasing the isolation. Still yet, an optical choker may be positioned at one of the ends of one of the branches for increasing the isolation.

In various embodiments, the optical system may function as an optical isolator and/or an optical attenuator. Optionally, both the first branch and the second branch may have a substantially rectangular cross-section.

Still yet, the first branch and the second branch may be components of a first optical isolator. Optionally, a wavelength selector may be coupled to the optical isolator to form a de-multiplexer.

Further, a second optical isolator may be integrated with the first optical isolator. Thus, an optical coupler may be formed. When the optical coupler is formed, such may optionally function as an add-multiplexer, an optical inserter or a polarization beam combiner. Moreover, the optical coupler may include a Y-splitter.

In another embodiment, the first optical isolator and the second optical isolator may be integrated with a third optical isolator to form an optical circulator with 3 ports. In the same manner, an N-port optical circulator can be built. An optional wavelength selector may also be coupled to the circulator to form a de-multiplexer.

Each of the foregoing embodiments may be made of a very simple structure and have numerous optional features: ruggedness, superb thermal and environmental properties, premium stability and reliability, and excellent optical performance that are independent of polarization. Moreover, they may be easily integrated with other optical and optoelectronic devices. Each of them may be built with one or a combination of the waveguide, optical fiber, micro-optic, and photonic crystal technologies.

Moreover, the optical system may be designed to function as a polarizer.

BRIEF DESCRIPTION OF THE DRAWINGS

FIG. 7 displays the magnified Y-junction of branches 14 and 15 in FIG. 1a.

DESCRIPTION OF THE PREFERRED EMBODIMENTS

FIGS. 1a, 1b, 1c, 1d, 1e, 1f, 1g and 1h each show an optical isolator/attenuator of one embodiment. Specially, each optical isolator/attenuator represents an optical device with a pair of ends. In the context of the present description, such ends may be any termination or intermediate reference points. For example, such ends may include an input port 18 and an output port 19.

Figure 1A:
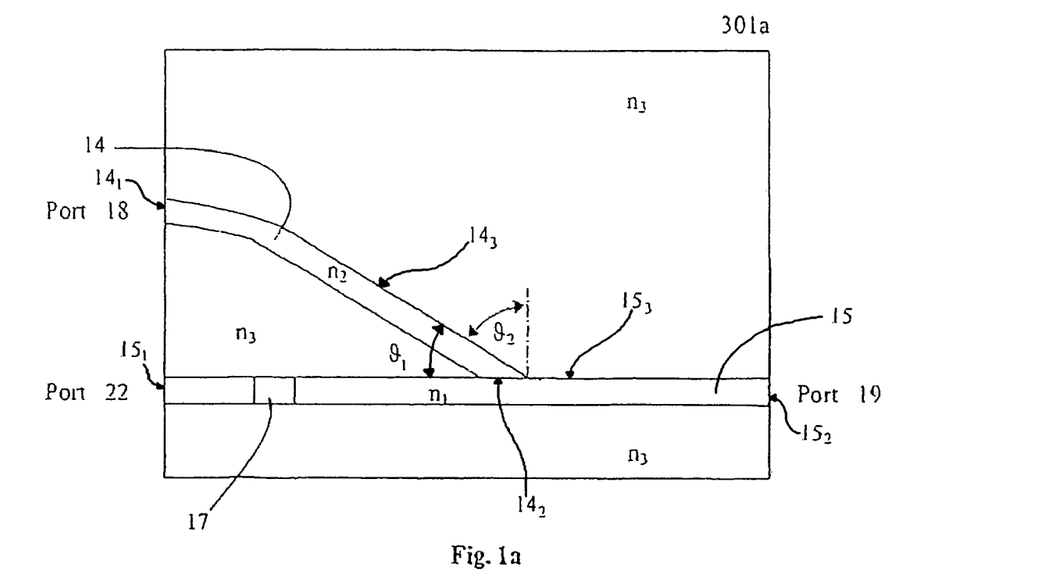
FIGS. 1a, 1b, 1c, 1d, 1e, 1f, 1g and 1h each show an optical isolator/attenuator of one embodiment.
Figure 1B:
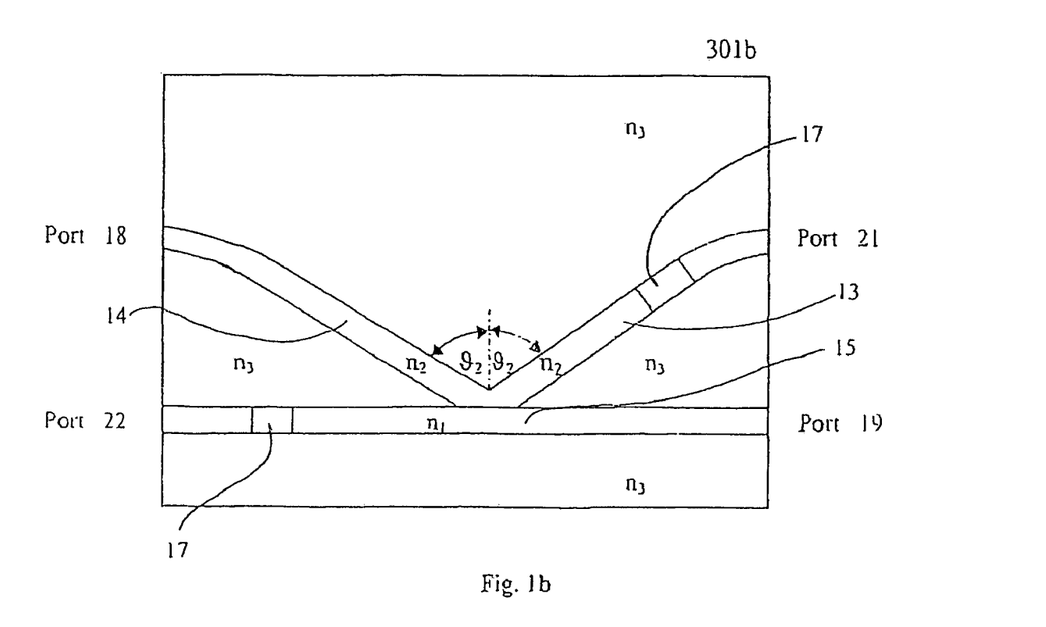
Figure 1C:
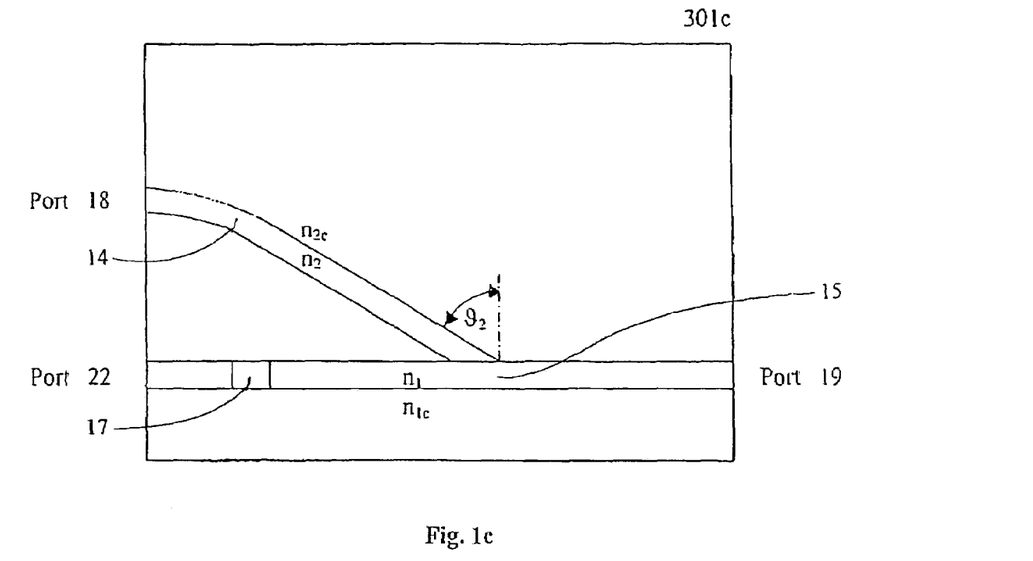
Figure 1D:
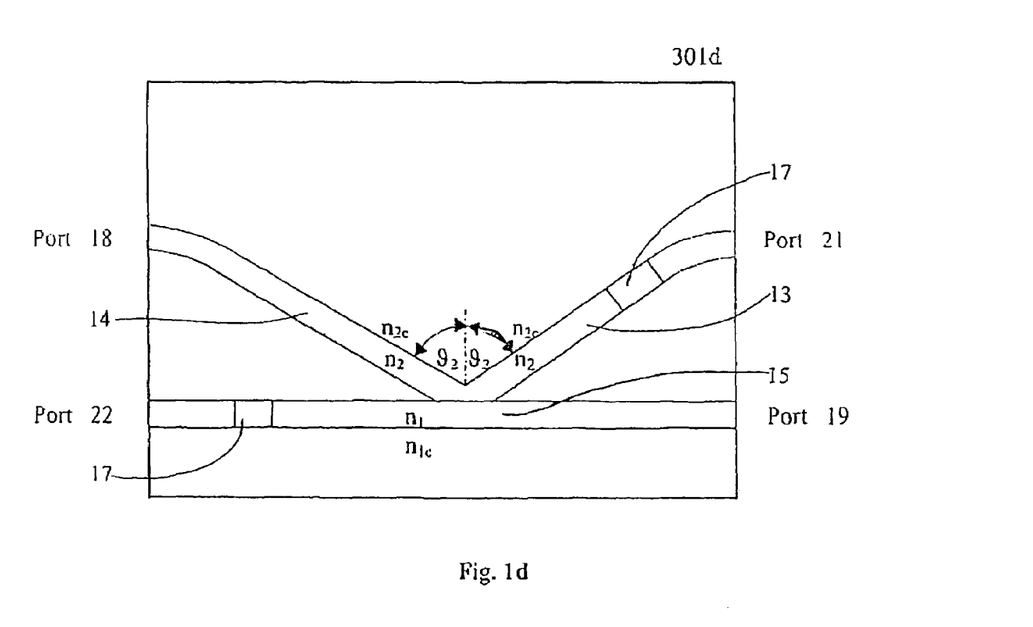
Figure 1E:
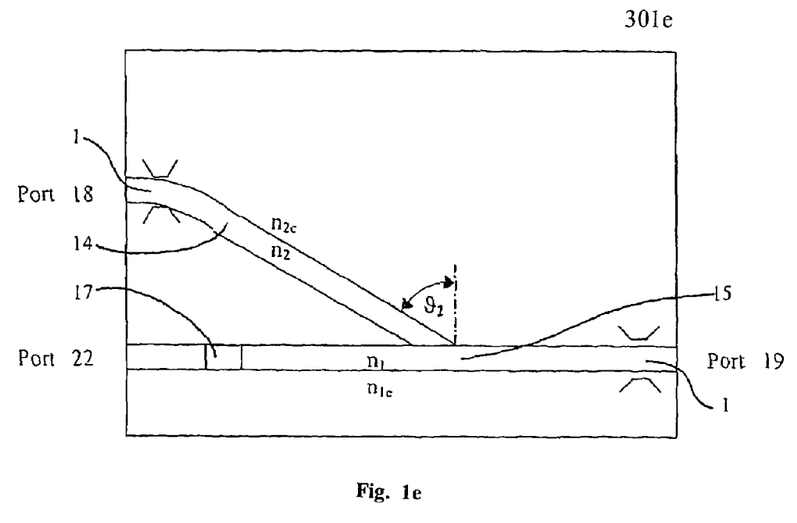

Optical isolators 301a, 301c and 301e of FIGS. 1a, 1c and 1e, respectively, comprise a Y-junction coupler made from two branches 14 and 15 of different refraction indices. In the context of the present description, a branch may refer to any medium capable of allowing light to pass therethrough. Referring to FIG. 1a, branch 15 extends in a horizontal (first) direction, and includes a first end $15_1$, a second end $15_2$, and a side edge $15_3$ extending between first end $15_1$ and second end $15_2$ in the horizontal (first) direction. Similarly, branch 14 includes a first end $14_1$, a second end $14_2$, and a side edge $14_3$ extending between first end $14_1$ and second end $14_2$ in a diagonal (second) direction. The second end $14_2$ of branch 14 abuts the side edge $15_3$ of branch 15 such that the interface to the branch 15 (i.e., horizontal), and forms an incidence angle $\theta_1$ relative to the side edge, and the side edge $14_3$ of the second branch 14 forms an angle ($\theta_2$) with the first side edge $15_3$ of the first branch 15.

Figure 1F:
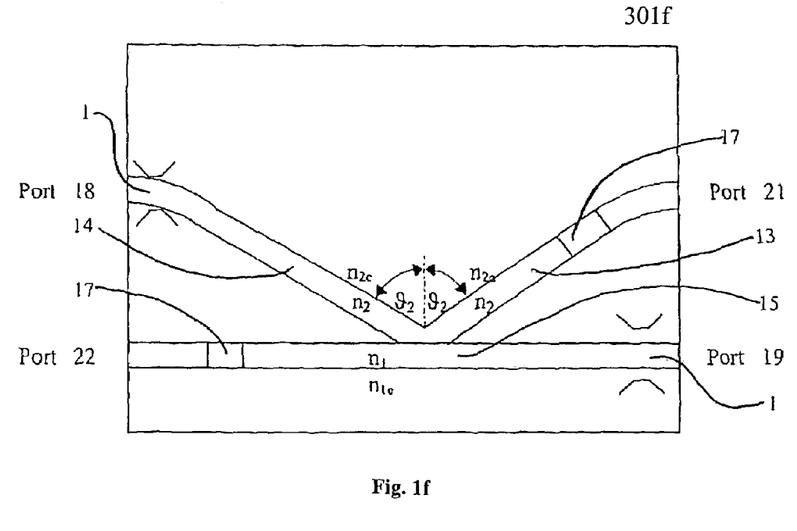

Optical isolators 301b, 301d, 301f of FIGS. 1b, 1d and 1f, respectively, comprise a K-junction. Moreover, optical isolators 301g, 301h of FIGS. 1g and 1h, respectively, comprise an X-Junction. Then an extra port (i.e. port 21) is available for monitoring output (i.e. port 19) as well as for feedback control of these optical isolators.

At the Y-junction of the optical isolators 301a, 301c, 301e (or K- or X-Junction in the other figures), the refraction index ($n_1$) of the branch 15 is greater than that ($n_2$) of the branch 14. An optical unidirectional Y-junction (K- or X-Junction) coupler may then be constructed using the total reflection principle. This ensures that light travels only in the forward direction. Incoming light from port 18 travels through branch 14, reaches branch 15 and through it to exit port 19. And for the reverse direction, light entering from port 19 passes through branch 15, meets the interface between the second end $14_2$ of branch 14 and the side edge $15_3$ of branch 15 with incident angle $\theta_1$ (cf. FIG. 7), but is blocked by the total reflection phenomenon because the condition of $\theta_1 \geq \sin^{-1}(n_2/n_1)$ is met. Thus, light cannot get into branch 14 but stays in branch 15. In the end, it either exits from port 22 or is consumed by an optional absorber 17. The following examples are estimations made based on the plane wave approximation:

EXAMPLE 1

Case 1)

For FIGS. 1a and 1b: given the refraction indexes $n_1$=1.465, $n_2$=1.460, $n_3$=1.455 and $\theta_2$=85.30°, then the calculated insertion loss is ~0.13 dB with ILp=0.129 dB and ILs=0.133 dB. The polarization dependent loss (i.e. ILs−ILp) is ~0.004 dB and the isolation is ~9 dB.

Case 2)

For FIGS. 1c and 1d: given the refractive indexes $n_1$=1.465, $n_{1c}$=1.460, $n_2$=1.4625, $n_{2c}$=1.4575 and $\theta_2$=86.70°, then the calculated insertion loss is ~0.13 dB with ILp=0.133 dB and ILs=0.136 dB. The polarization dependent loss is ~0.003 dB while the isolation is also ~9 dB.

Thus, the isolation is polarization independent (ILp≈ILs). However, the isolation of ~9 dB is below expectation. In Case 1 of Example 1 above, although with ideally parallel incident light, the numerical aperture of the output light NA($n_1$, $n_3$) is 0.171 at the output port 19 while the other numerical apertures are: NA($n_2$, $n_3$)=0.121, NA($n_1$, $n_2$)=0.121. Since NA ($n_1$, $n_3$) is greater than NA ($n_1$, $n_2$), a portion of the reverse light from Port 19 is able to get into port 18. This is because the incident angle of some reverse light $\theta_1$ (as in FIG. 7) is smaller than the total reflection critical angle $\theta_{1c}$, causing the isolation to be low. The resultant isolation is dependent on the effectiveness of the total reflection for the reverse light. The better the effectiveness of the total reflection for the reverse light, the higher the isolation.

One optional way to achieve higher isolation is to lower the numerical aperture of the output port 19. Additional optical output ports 301i and 301j are illustrated by FIGS. 1i and 1j respectively. For the optical output port 301i, calculations indicate that for 97% of the output light, the numerical aperture has dropped to 0.121 (NA($n_2$, $n_3$)). For the other 3%, the numerical aperture is still 0.171 (NA($n_1$, $n_3$)). Removing this 3% of output light decreases the NA to 0.121, but it increases the insertion loss by 0.13 dB while the area of the output light is enlarged. For the optical output port 301j, the optimal calculations generated essentially the same results but with an output area that is larger than that of 301i. Although the output numerical aperture has been lowered, the isolation is not improved since the extra reverse light due to the enlarged area of port 19 is getting into port 18.

Figure 1G:
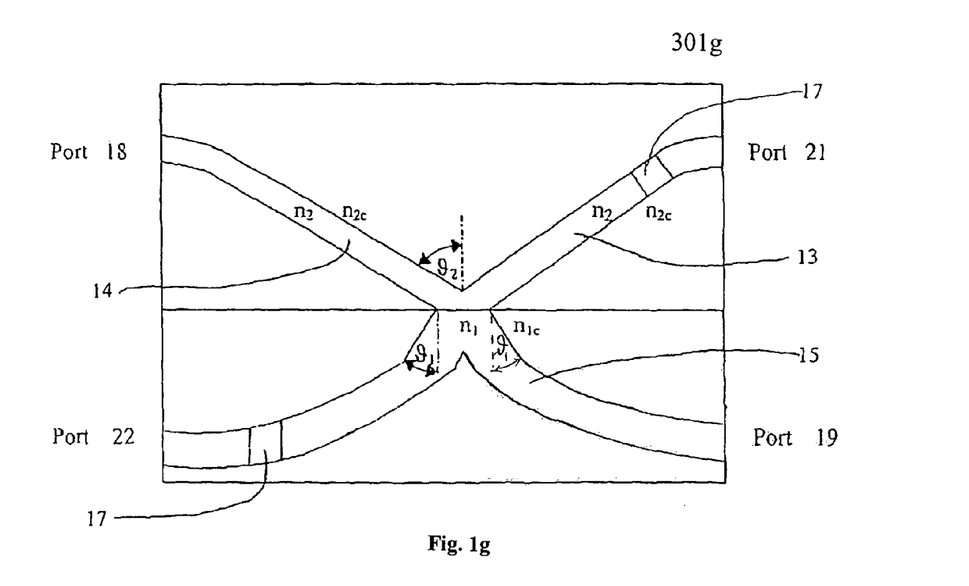

One can use an X-Junction to lower the numerical aperture of the output port 19 (see, for example, FIG. 1g). The following examples are pertinent to the embodiment of FIG. 1g.

EXAMPLE 2

For FIG. 1g: given the refraction indexes $n_1$=1.500, $n_{1c}$=1.4958, $n_2$=1.450 $n_{2c}$=1.4457, $\theta_2$=85° and $\theta_1$=76°, the calculated insertion loss are ILp=1.24 dB and ILs=1.39 dB. The polarization dependent loss is ~0.15 dB, the numerical aperture of the output port 19 is low and thus the isolation greatly increases to ~12 dB.

Figure 1H:
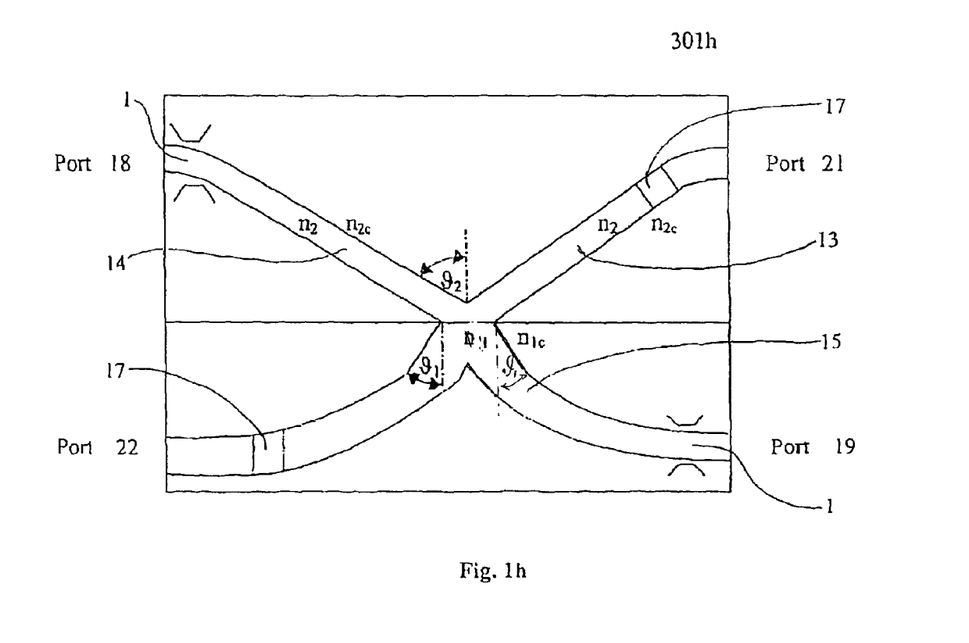
Figure 1I:
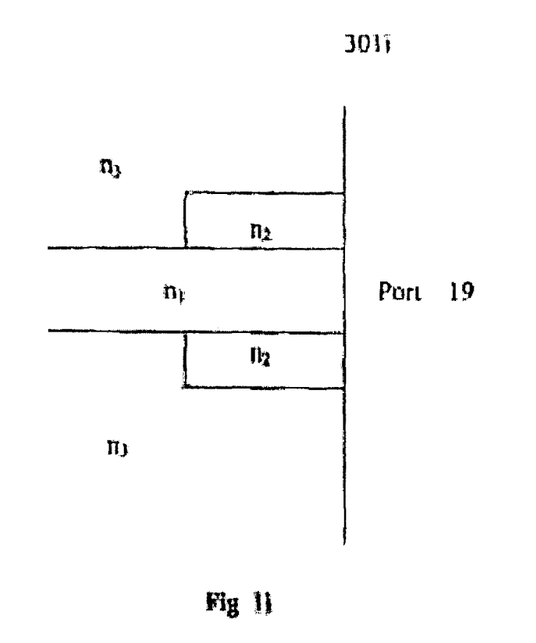
FIGS. 1i and 1j show a modified output port of FIGS. 1a and 1b.
Figure 1J:
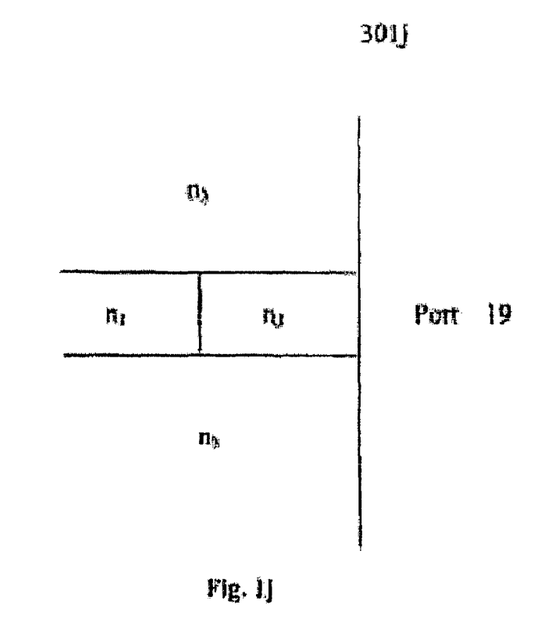

Another way of improving isolation for 301a, 301b, 301c, 301d, 301e and 301f is to decrease the transmitting area of the reverse light from branch 15 to branch 14. If it is reduced to one half, the isolation increases by 3 dB, and by 6 dB if it is reduced to one fourth. And if all the reverse light were reflected at the junction of branches 15 and 14, then the isolation becomes perfect. Therefore, one may add an optical choker 1 to port 18, 19, as shown in FIGS. 1e, 1f and 1h. The optical choker 1 serves two purposes: (1) it lowers the numerical aperture NA, for example from 0.171 to 0.1 or even 0.01 (2) it converges the light to the center part of branches 14 and 15. The resultant optical isolators 301e, 301f and 301h of FIGS. 1e, 1f and 1h have much better optical performance and still can be easily cascaded and integrated.

Optical isolators 301a, 301b, 301c, 301d, 301e, 301f, 301g and 301h may also function as an optical attenuator. Light coming in from port 18 exits from port 19 with a fixed amount of attenuation. See Example 3:

EXAMPLE 3

In the context of Example 1, if the input light numerical aperture NA was 0.12 and $\theta_2=85°$, the attenuation of both the p- and s-polarization are $\approx 4.3$ dB and their difference is almost zero (0.009 dB).

Therefore, the attenuation is polarization independent. Calculations indicate that the smaller the angle $\theta_2$, the larger the attenuation. The attenuation can be varied with the changing incident angle $\theta_2$. Thus, a variable optical attenuator is also feasible.

Optical isolator 301a, 301b, 301c, 301d, 301e, 301f, 301g and 301h, based on the total reflection principle, have a very simple structure and result in numerous improvements: its ruggedness, its superior thermal and environmental properties, its exceptional stability and reliability, and its excellent polarization independent optical performance. Moreover, it is easily integrated with other optical and opto-electronic devices. These qualities make it suitable to construct other optical devices such as a coupler, inserter, polarization beam combiner, circulator, add-multiplexer, and de-multiplexer.

To optimize the optical isolators 301a, 301b, 301c, 301d, 301e, 301f, 301g and 301h, the shape of the Y-, K- or X-Junction may be changed. Different refractive index $n_1$ and $n_2$ of branches 15 and 14 may be obtained (from different dielectric materials or the same dielectric material with different effective refractive index from tapered shape). The refractive index may not necessarily be constant, but rather be a function of position x, y, and z. The cross section of branches (waveguide or optical fibers, etc.) may, in one embodiment, be square or rectangular.

Thus, one embodiment is based on the non-reciprocal phenomenon of total reflection and can be polarization independent and ideally suited for integration. According to Snell's law of optical refraction, total reflection occurs when light propagates from an optically denser medium (with a higher refractive index $n_1$) into another less dense medium (with a lower refractive index $n_2$), and the incident angle $\theta_1$ exceeds the critical value $\theta_{1C}$, that is $\theta_1 \geq \theta_{1C} = \sin^{-1}(n_2/n_1)$.

As a result, all the incident light is reflected back into the first medium, and the transmitted light is totally blocked. Since $n_1$ is greater than $n_2$, $n_2$ must not be greater than $n_1$. Thus, the total reflection is non-reciprocal and it occurs only when light travels from $n_1$ medium into $n_2$ medium, but never occurs for the reverse direction from $n_2$ medium into $n_1$ medium. Utilizing total reflection, one may build optical isolators 301a, 301b, 301c, 301d, 301e, 301f, 301g and 301h. Any combination of suitable branches could constitute as the optical transmission path and can be easily integrated with other opto-electronic devices (e.g. semiconductor devices).

Figure 2A:
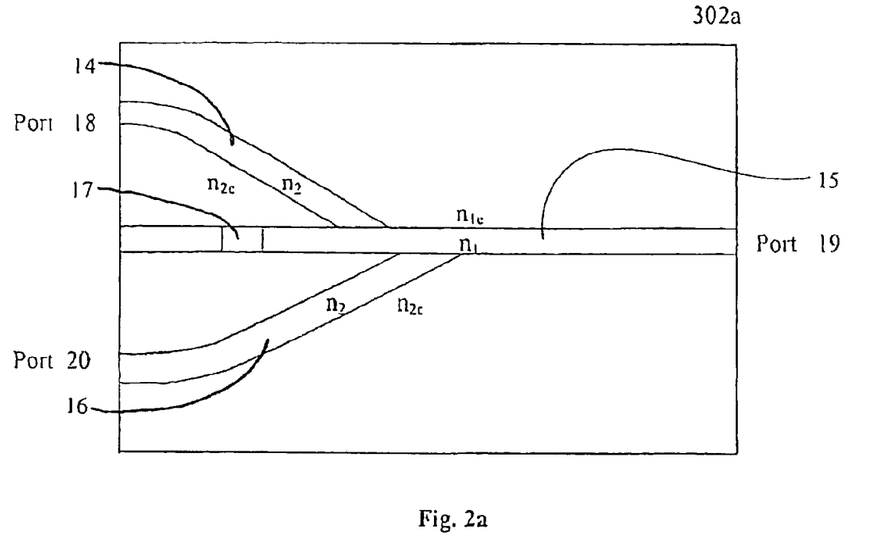
FIGS. 2a and 2b show the optical coupler/inserter/add-multiplexer/polarization beam combiner of one embodiment.
Figure 2B:
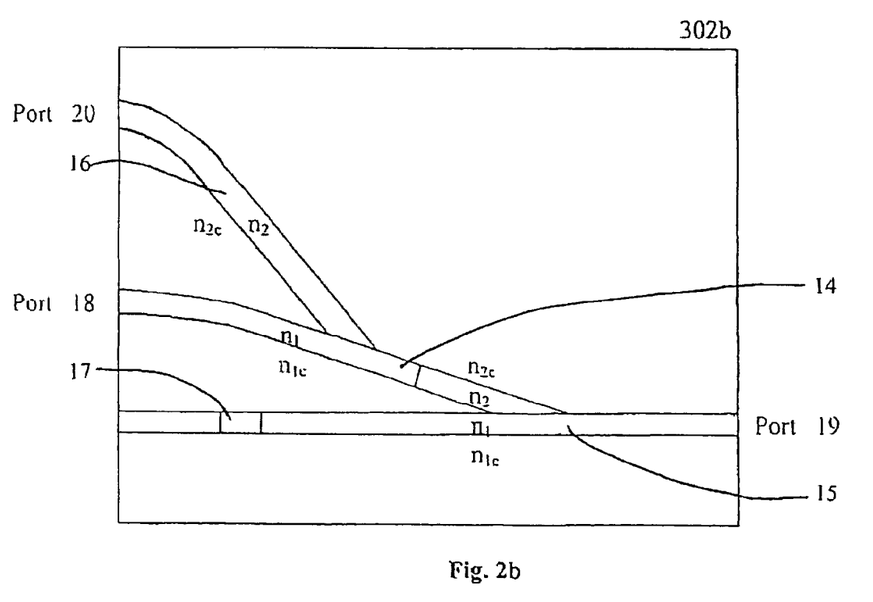

FIGS. 2a and 2b represent an optical coupler 302a and 302b built by cascading a series of optical isolators 301e, 301f and 301h together (for simplification, the K- and X-Junction type and the optical chokers 1 are not shown). Lights from input ports 18, 20 travel to output port 19. Shown are 2×1 couplers with isolation function. Optical coupler 302a and 302b may also be used as polarization beam combiner with isolation because of their polarization independent performance. Optical couplers 302a and 302b also work as add-multiplexer to add an extra channel of signal ($\lambda_j$) from port 20 to an existing channel of signals ($\lambda_1, \lambda_2 \ldots$) from input port 18 without interfering each other, and outputs all signals ($\lambda_1, \lambda_2 \ldots \lambda_j$) from port 19. An N×1 add-multiplexer may be built using the same approach. Moreover, optical couplers 302a and 302b also work as an optical inserter (with isolation) for an optical fiber amplifier device with the optical signal connected to port 18, the pump laser connected to port 20, and the output port 19 connected to a fiber amplifier (not shown).

Figure 3:
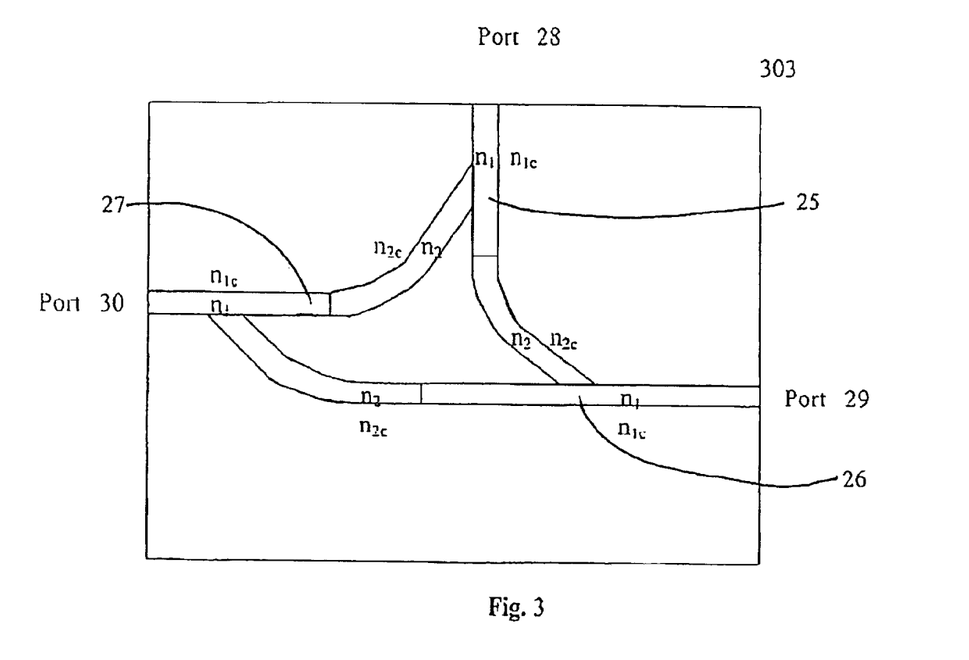
FIG. 3 represents an optical circulator of one embodiment.

FIG. 3 depicts an optical circulator 303 built with three optical isolators 301e, 301f, and 301h without absorbers (again for simplification, the K- and X-Junction type and the optical chokers 1 are not shown). Light entering at port 28 travels along and leaves at the next port 29. In a similar manner, light from port 29 may exit port 30, and so on. The circulator 303 is also polarization independent. Optical circulators with 4 or more ports can be built in the same way.

Figure 4:
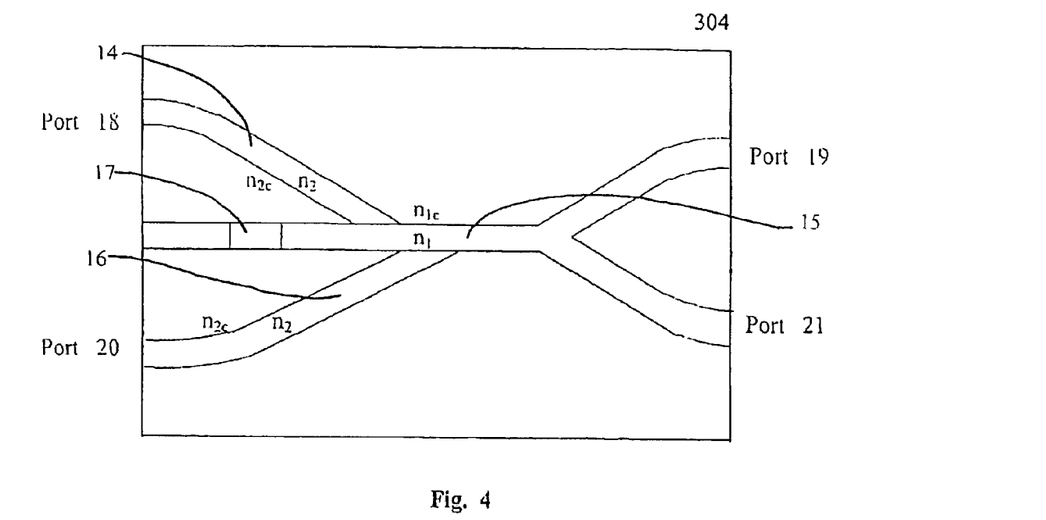
FIG. 4 exhibits a 2×2 optical coupler with isolation among its inputs and outputs.

FIG. 4 shows a 2×2 optical coupler 304. It comprises a 2×1 optical coupler 302a (or 302b) and a Y-splitter. Light coming from ports 18 and 20 travels to the output ports 19 and 21. Shown is a 2×2 optical coupler with isolation among the input ports and output ports. In principle, an N×M optical coupler with isolation may even be built.

Figure 5:
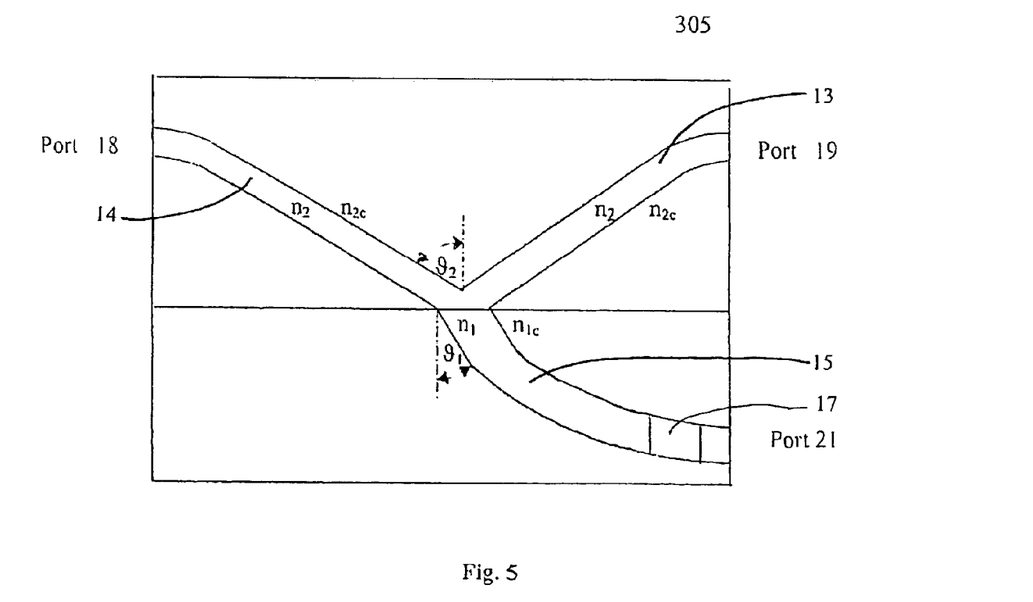
FIG. 5 depicts an optical polarizer of one embodiment.

FIG. 5 illustrates a polarizer 305 with an input port 18, an output port 19 and an optional absorber 17. See Example 4:

EXAMPLE 4

Given $n_1=4.25$, $n_{1c}=4.248$, $n_2=1.460$, $n_{2c}=1.455$, $\theta_2=71.04°$, and $\theta_1=19°$, the resulting attenuation of the p-polarization light is $A_p=2.2\times 10^{-9}$ dB whereas attenuation of the s-polarization is $A_s=4.2$ dB at port 21.

The attenuation is therefore very much polarization dependent. Input light from port 18 with intensity (p, s), where p is the intensity of p-polarization and s is the intensity of s-polarization respectively, travels through the branch 14 to reach the junction. On one hand, it refracts into branch 15 and continues on to exit port 21 with intensity (p, 0.38s). On the other hand, it reflects into branch 13 and continues on to output port 19 with intensity (0, 0.62s). Port 19 is the output port of the polarized light.

The insertion loss of the polarizer 305 is low at 2.07 dB. Consequently, it does not have good isolation. But, an optical isolator 301a, 301b, 301c, 301d, 301e, 301f, 301g and 301h can be integrated to build a polarizer 305 with good isolation.

Figure 6A:
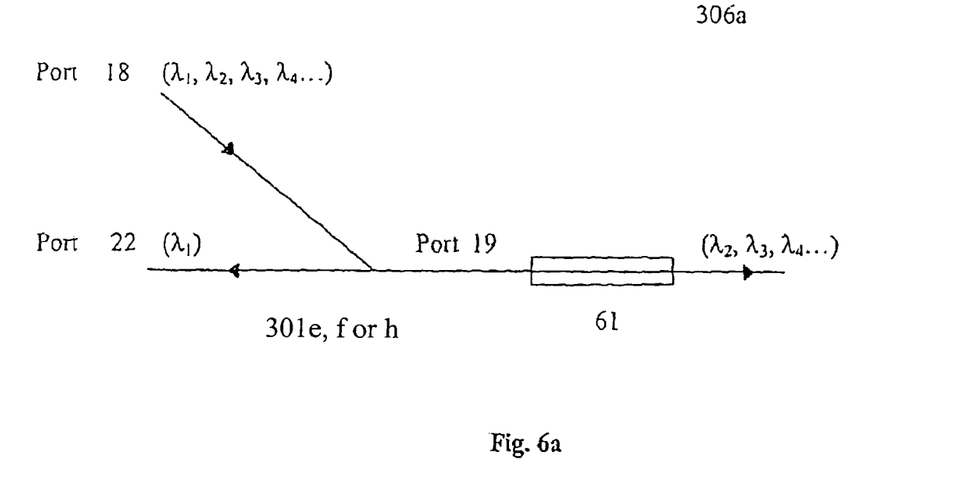
FIGS. 6a and 6b illustrate an optical de-multiplexer of one embodiment.

FIG. 6a exhibits a de-multiplexer 306a. It consists of an isolator 301e (301f or 301h) but without the absorber 17, and a wavelength selector 61. The wavelength selector 61 may be a band pass filter or a Bragg Gratings (with fiber or waveguide technology). Light signals with wavelength ($\lambda_1$, $\lambda_2, \lambda_3 \ldots$) coming from input port 18 travel through the output port 19 to reach the wavelength selector 61. Then, the selected wavelength (e.g. $\lambda_1$) is reflected and exits from port 22. The other signals with wavelength ($\lambda_2, \lambda_3 \ldots$) are transmitted through the selector 61 without loss.

Figure 6B:
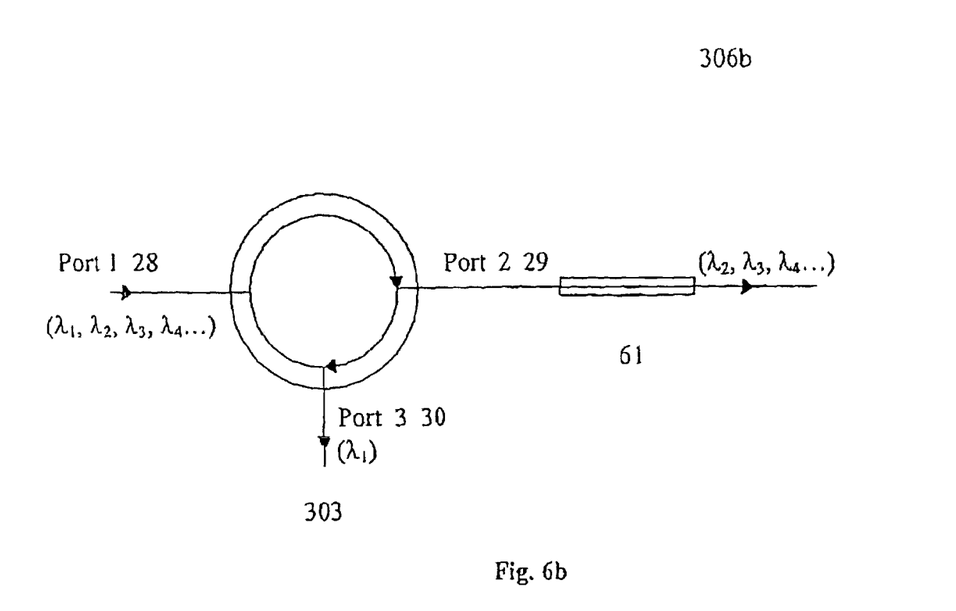

Similarly, FIG. 6b displays a de-multiplexer 306b. It includes a circulator 303 and a wavelength selector 61. Optionally, the add-multiplexers 302a and 302b and de-multiplexers 306a and 306b can be cascaded together to construct an add-/drop-multiplexer (not shown).

Figure 7:
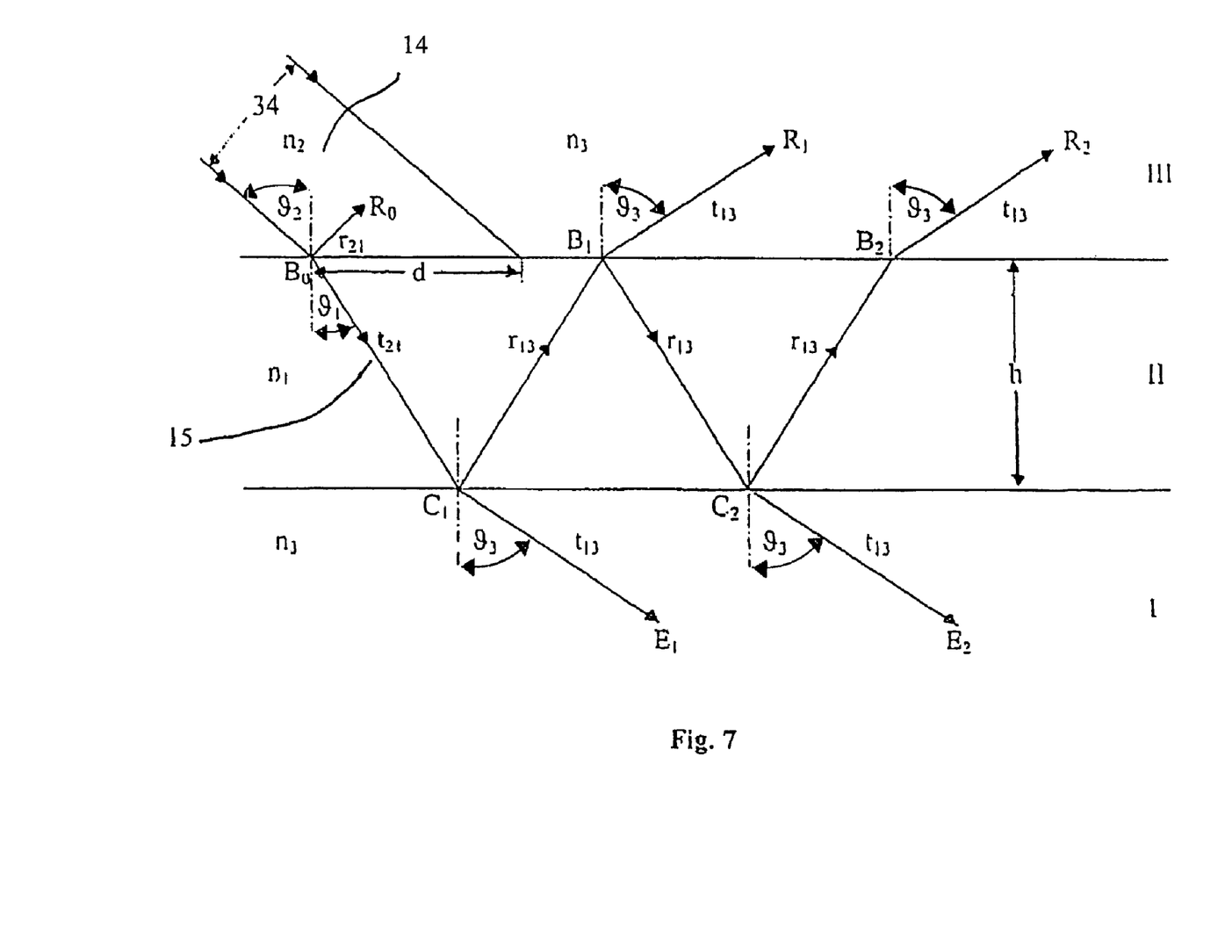

FIG. 7 is a magnified Y-junction of branches 14 and 15 of the optical isolator 301a. The incident ray of light 34 passes through the isolator 301a. On its way, it is reflected $r_{21}$ and refracted $t_{21}$ at $B_0$, again reflected $r_{13}$ and refracted $t_{13}$ at $C_1$, and then again at $B_1, C_2, B_2, \ldots$ and so on according to the Fresnel's formulae. For the most intensity of the incident light 34 to pass from the branch 14 into the branch 15, $2h \tan \theta_1 > d$ may be satisfied, where d and h are the width of branches 14 and 15 respectively. The transmission coefficient is $t_{ij}=2p_i/(p_i+p_j)$, the reflection coefficient is $r_{ij}=(p_i-p_j)/(p_i+p_j)$ where $p_i=n_i/\cos\theta_i$ for the TM wave, $p_i=n_i\cos\theta_i$ for the TE wave and i, j=1, 2, 3 for medium $n_1, n_2, n_3$. Then, the transmissivity of region I is $T=p_3|t|^2/p_1$ where $t=t_{21}t_{13}/(1-r_{13}^2 e^{i2\beta})$. The phase difference of the adjacent transmitted lights $E_1$ and $E_2$ is $2\beta=(4\pi h n_1 \cos\theta_1)/\lambda_0$ where $\lambda_0$ is the light wavelength in vacuum. If $\theta_2 \geq \theta_{2c}=\sin^{-1}(n_3/n_2)$, internal total reflections occur at $C_1, C_2 \ldots B_1, B_2 \ldots$ and $p_3$ becomes a pure imaginary number. Hence the time average of the transmissivity T is zero. Similarly, the time average of the reflectivity R ($R_1, R_2, \ldots$) is also zero with the exception of $R_0=r_{21}^2$. Since the energy flux of $R_0$ can be very small and it almost always escapes into $n_3$ medium, it does not add to the reflection loss of the optical isolator.

Figure 8:
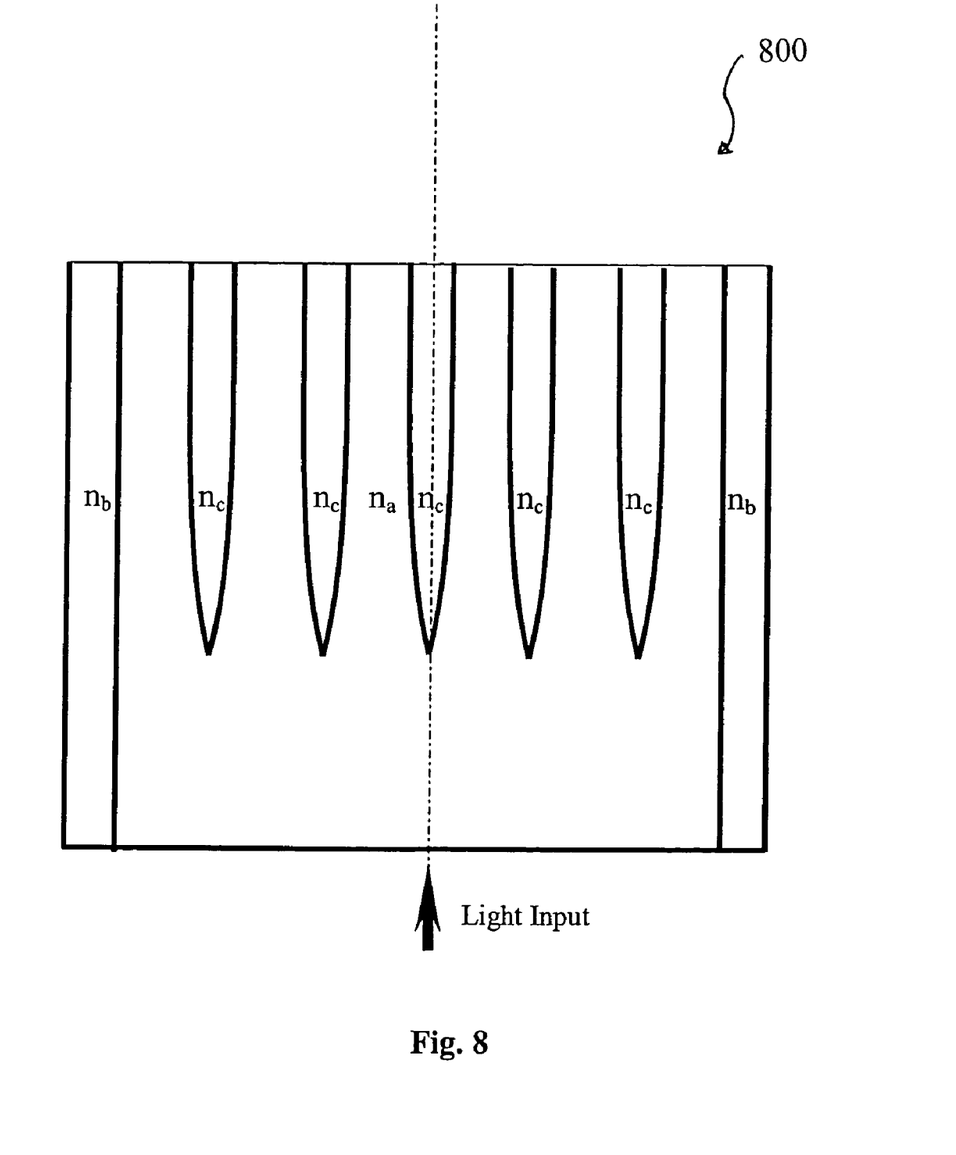
FIG. 8 illustrates an optical choker of one embodiment.

FIG. 8 illustrates an optical choker 800 of one embodiment.

In another embodiment, a computer program operates on a set of input parameters and desired output parameters associated with an optical system under design. Given such inputs, the computer program calculates and simulates the optical system, optimizes it so the resultant outputs meet the desired conditions such as the power, isolation, insertion loss, polarization, polarization dependent loss, return loss, etc. Optionally, the various concepts and equations set forth hereinabove may be incorporated into the computer program for being calculated accordingly.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An optical system, comprising:
   a first branch aligned in a first direction and having a first end, a second end, and a first side edge extending between the first and second ends such that the first side edge is parallel to the first direction, the first branch being capable of allowing light to pass therethrough in a forward direction from the first end to the second end and a reverse direction from the second end to the first end, the first branch including a first medium with a first refractive index ($n_1$);
   a second branch aligned in a second direction and having a first end, a second end, and a second side edge extending between the first and second ends such that the second side edge is parallel to the second direction, the second branch being capable of allowing light to pass therethrough in a forward direction from the first end to the second end, the second branch including a second medium with a second refractive index ($n_2$), the second end of the second branch abutting the first side edge of the first branch to form an interface, wherein the second side edge of the second branch forms an angle ($\theta_2$) with the first side edge of the first branch, and wherein the interface is aligned parallel to the first direction and forms an incident angle ($\theta_1$) with the first side edge of the first branch;
   wherein $n_2<n_1$ and $\theta_1 \geq \sin^{-1}(n_2/n_1)$, whereby light passing through the first branch in the reverse direction is prevented from passing into the second branch through the interface.

2. The optical system of claim 1, wherein the first branch and the second branch are components of a Y-junction.

3. The optical system of claim 1, wherein the first branch and the second branch are components of a K-junction.

4. The optical system of claim 1, wherein the first branch and the second branch are components of an X-junction.

5. The optical system of claim 3, wherein an extra port is available for monitoring an output as well as for feedback control of the optical system.

6. The optical system of claim 4, wherein an extra port is available for monitoring an output as well as for feedback control of the optical system.

7. The optical system of claim 1, wherein the first branch includes an optical absorber for absorbing the light passing in the reverse direction that is prevented from passing into the second branch.

8. The optical system of claim 1, wherein isolation provided between the first branch and the second branch is polarization independent.

9. The optical system of claim 1, wherein a numerical aperture of one of the ends of one of the branches is lowered for increasing isolation.

10. The optical system of claim 1, wherein a transmitting area of one of the branches is decreased for increasing isolation.

11. The optical system of claim 1, wherein an optical choker is positioned at one of the ends of the second branch for increasing isolation.

12. The optical system of claim 1, wherein the optical system functions as an optical isolator.

13. The optical system of claim 12, and further comprising a wavelength selector coupled to the optical isolator to form a de-multiplexer.

14. The optical system of claim 1, wherein the optical system functions as an optical attenuator.

15. The optical system of claim 1, wherein the first branch and the second branch have a substantially rectangular cross-section.

16. The optical system of claim 1, wherein the first branch and the second branch are components of a first optical isolator, and further comprising a second optical isolator integrated with the first optical isolator.

17. The optical system of claim 16, wherein an optical coupler is formed.

18. The optical system of claim 17, wherein the optical coupler functions as an add-multiplexer.

19. The optical system of claim 17, wherein the optical coupler functions as a polarization beam combiner.

20. The optical system of claim 17, wherein the optical coupler functions as an optical inserter.

21. The optical system of claim 17, wherein a Y-splitter added to the optical coupler forms an N×M optical coupler.

22. The optical system of claim 16, wherein the first optical isolator and the second optical isolator are integrated with a third optical isolator to form an optical circulator.

23. The optical system of claim 22, and further comprising a wavelength selector coupled to the circulator to form a de-multiplexer.

24. The optical system of claim 1, wherein a polarizer is formed.

25. The optical system of claim 1, wherein the system includes at least one of a waveguide, an optical fiber, a micro-optic, and a photonic crystal.

26. An optical method, comprising:
   passing light through a first branch aligned in a first direction and having a first end, a second end, and a first side edge extending between the first and second ends such that the first side edge is parallel to the first direction, the first branch being capable of allowing the light to pass therethrough in a forward direction from the first end to the second end and a reverse direction from the second end to the first end, the first branch including a first medium with a first refractive index ($n_1$);

passing light through a second branch aligned in a second direction and having a first end, a second end, and a second side edge extending between the first and second ends such that the second side edge is parallel to the second direction, the second branch being capable of allowing the light to pass therethrough in a forward direction from the first end to the second end, the second branch including a second medium with a second refractive index ($n_2$), the second end of the second branch abutting the first side edge of the first branch to form an interface, wherein the second side edge of the second branch forms an angle ($\theta_2$) with the first side edge of the first branch, and wherein the interface is aligned parallel to the first direction and forms an incident angle ($\theta_1$) with the first side edge of the first branch;

wherein $n_2 < n_1$ and $\theta_1 \geq \sin^{-1}(n_2/n_1)$, whereby light passing through the first branch in the reverse direction is prevented from passing into the second branch through the interface.

* * * * *